2 Sheets—Sheet 1.

R. O. CROWLEY.
Electric Registers for Voting.

No. 213,875. Patented April 1, 1879.

WITNESSES:
W. W. Hollingsworth
Edw. W. Byrn.

INVENTOR:
R. O. Crowley
BY
ATTORNEYS.

N. PETERS, PHOTO-LITHOGRAPHER, WASHINGTON, D. C.

R. O. CROWLEY.
Electric Registers for Voting.

No. 213,875.                    Patented April 1, 1879.

WITNESSES:
W. W. Hollingsworth
Edw. W. Byrn

INVENTOR:
R. O. Crowley
BY
ATTORNEYS.

UNITED STATES PATENT OFFICE.

ROY O. CROWLEY, OF BALTIMORE, MARYLAND, ASSIGNOR TO HIMSELF AND JOHN BOYD, OF SAME PLACE.

IMPROVEMENT IN ELECTRIC REGISTERS FOR VOTING.

Specification forming part of Letters Patent No. 213,875, dated April 1, 1879; application filed November 9, 1878.

*To all whom it may concern:*

Be it known that I, ROY O. CROWLEY, of Baltimore city, State of Maryland, have invented a new and Improved Means for Taking and Indicating the Votes of a Legislative Body; and I do hereby declare that the following is a full, clear, and exact description of the same, reference being had to the accompanying drawings, forming part of this specification, in which—

Figure 1:
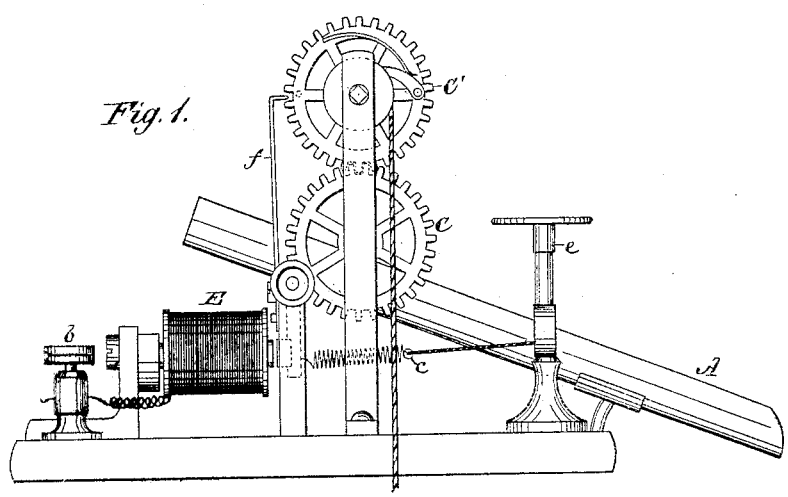
Figure 2:
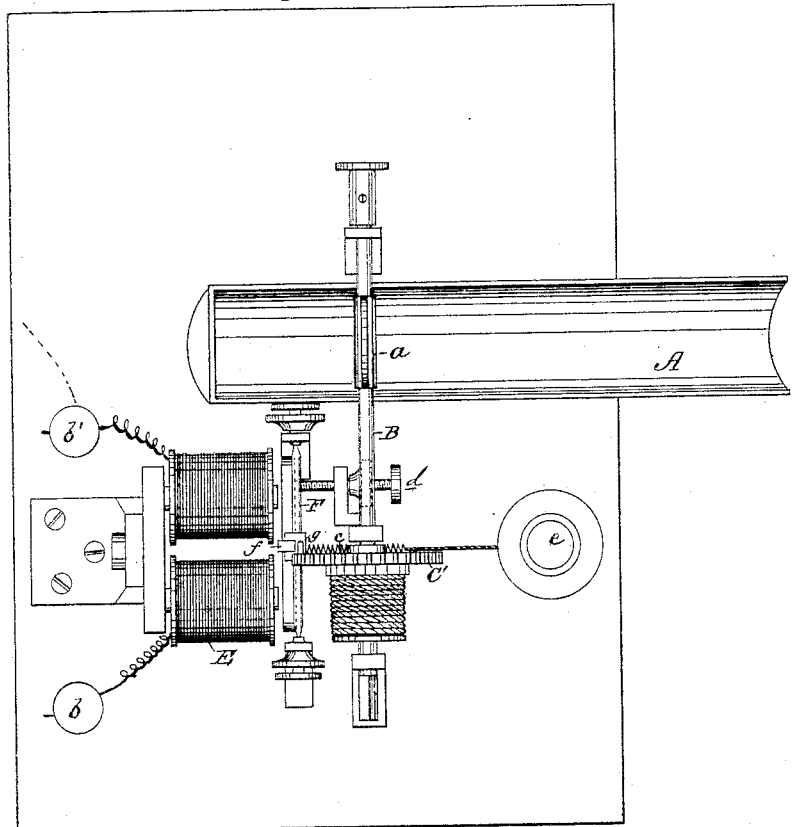

Figure 1 is a side view of one of the instruments; Fig. 2, a plan; and Fig. 3 is a view showing the general arrangement of the apparatus employed by each member.

The invention relates to an improvement in that form of voting apparatus in which balls are released by mechanism operated through an electric circuit, and when thus released roll down canals into an affirmative or negative indicator, as the case may be.

The improvement consists in the improved construction and arrangement of devices for releasing said balls, as hereinafter fully described.

Figure 3:
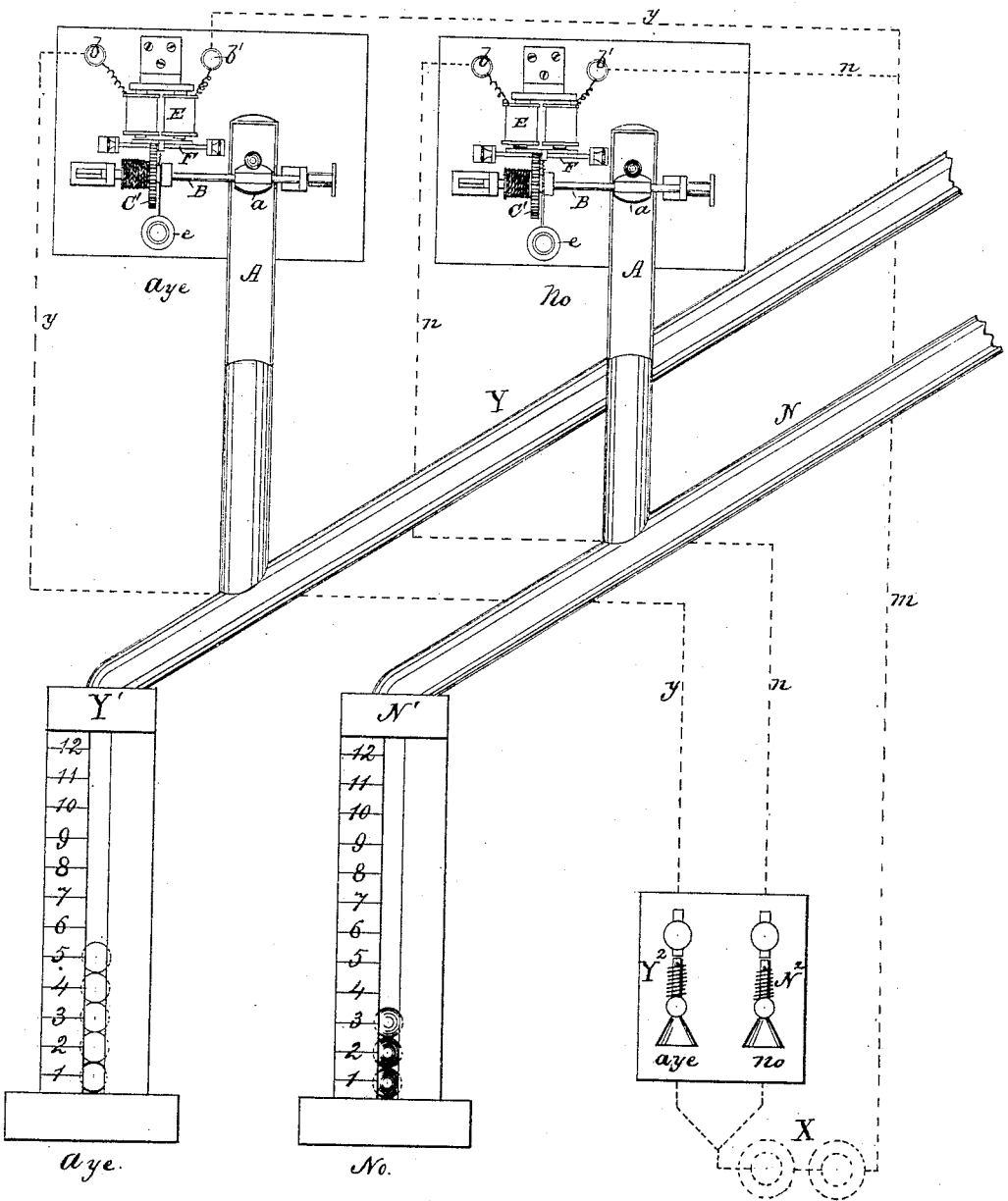
Figure 3:
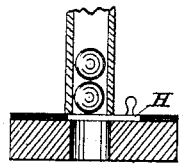

In the drawings, Figures 1 and 2 represent one of the instruments, of which there are two for each member, arranged in relation to each other, the channels, the electric circuits, and the keys, as shown in Fig. 3. Each one of these instruments is a counterpart of the other, and has a chute, channel, or trough, A, mounted in inclined position upon suitable pillars or supports, and communicating at its lower end with one of the main canals. Within the curvature or hollow of the trough A is located a stop, $a$, consisting of a fan-blade or disk mounted upon a transverse shaft, B, so that when said blade is at right angles to the trough it fills the hollow of the same and retains the ball placed in the portion of the trough above it, and when turned into a parallel position with the trough allows the ball to pass down beneath it. The shaft B, upon which this stop is mounted, is journaled in suitable bearings, and carries a gear-wheel, C, engaging with another gear-wheel, C', located above the same. Upon the same shaft with the wheel C' is located a loose drum, which is geared to the wheel C' by a ratchet-wheel and pawl, and upon which drum is wound a cord carrying a weight, which furnishes in unwinding the motive power for operating the stop-disk.

Instead of using the weight and cord, I may use a spring for thus operating the stop, and instead of a separate wheel and shaft, C', I may place the spring or weight on an extension of the same shaft B which carries the stop.

E is an electro-magnet, whose wires lead to the binding-posts $b$ $b'$, connected with the opposite poles of the battery. F is the armature of the magnet, whose tension is adjusted by the spring $c$ and tension-adjuster $e$, and whose play upon the poles of the magnet is regulated by the adjusting-screw $d$. Rising from the armature of the magnet is a hooked arm, $f$, which, when the circuit is closed and the armature is attracted, is thrown into range with a stop-pin, $g$, on wheel C' to prevent its movement, and which, when the circuit is broken and the armature is drawn back, moves from the tension of the spring $c$ out of the range of the stop-pin $g$, and allows the wheel to rotate and the ball to pass down the channel, the said stop-disk in the channel and the stop-pin $g$ on the wheel C' being so relatively arranged as to cause the said stop-pin to strike the extension from the armature just when the stop-disk $a$ is at right angles to the trough, so as to retain the ball.

The construction and operation of the individual instruments having thus been described, I will now proceed to describe their arrangement and operation with respect to the other parts.

Y is a channel, trough, or tube communicating with all of the troughs A of the "Aye" instruments, and N a similar channel, trough, or tube communicating with all of the troughs A of the "No" instruments. These two main channels lead, respectively, to an "Aye" and "No" receiver and indicator $Y^1$ and $N^1$, which will be hereinafter described.

$Y^2$ $N^2$ are keys arranged upon the members' desks, and connected, $Y^2$ with the "Aye" instrument by the electric circuit $y$ $y$ $y$ $y$ $m$, and $N^2$ with the "No" instrument by the electric circuit $n$ $n$ $n$ $n$ $m$, the current from the battery X dividing between these two circuits.

The combined receivers and indicators $Y^1$ $N^1$ are made exactly alike, but are preferably painted different colors to contrast with the different-colored ivory balls, which are used for affirmative and negative voting. Said indicators are in the nature of narrow vertical chambers or bars having a vertical groove or channel to receive one ball at a time and hold them in upright position, one above the other. Through the side of the chamber or channel extends a longitudinal slot, which permits the balls to be seen as they drop down into the same, and upon the side of the slot are graduated marks spaced a distance apart equal to the diameter of the balls, and provided with numbers beginning from one at the bottom, to indicate the number of balls in a column of any given height.

These receivers are to be made of an ornamental character, and may be directly behind the speaker's desk in perpendicular position. When the voting is done the balls are let out of the bottom of the indicators by removing from beneath them the sliding door H, the balls being returned by a special attendant to their several troughs in the instruments ready for the next vote. Now, the balls all being in position, and the electric circuit being closed, if a vote is to be taken, those members wishing to vote affirmatively will pull their "Aye" knobs at their desks, and then let them go. The instant the knob is pulled the electric current is broken, and the armature of the magnet, no longer feeling the influence of the current, is drawn away from the poles of the magnet by the spring, thus removing the tooth or hook at the end of the upright arm from the stop-pin on the wheel, which at once revolves by the power of the weight or spring and turns the shaft of the stop-disk a revolution, the motion being then arrested again by the immediate closing of the circuit and the re-engagement of the hooked arm with the stop-pin just at the time when the stop-disk is at right angles to the trough. The balls which were thus released roll down these channels and drop into the "Aye" indicator. As many members as have pulled their affirmative knobs just so many balls will drop into the affirmative indicator, and the figure opposite the top ball will indicate the total number of affirmative votes. Those members pulling their negative knobs will cause balls of the opposite color to drop into the negative-indicator, and the top ball in that indicator will show the negative vote.

In defining my invention more clearly, I would state that I do not claim as new the indicators, nor the general idea of a set of balls adapted to be released by mechanism operated by an electric circuit, but only the specific devices for releasing the balls, the chief distinctive feature of which rests in operating the stop-shaft by a constantly-acting driving mechanism, or a driving mechanism exerting a constant tension, which it will be seen avoids the necessity of resetting, after every vote, the device which sustains the ball.

Having thus described my invention, what I claim as new is—

The combination, with the trough A and shaft B, carrying the stop $a$, of a constantly-acting driving mechanism geared with the said shaft, together with a stop controlling the driving mechanism and an electro-magnet controlling the stop, substantially as herein shown and described.

ROY O. CROWLEY.

Witnesses:
   THOS. M. NORRIS,
   MOSES NORRIS.